United States Patent
Martin et al.

(10) Patent No.: US 11,117,097 B2
(45) Date of Patent: Sep. 14, 2021

(54) NOX ADSORBER CATALYST

(71) Applicant: Johnson Matthey Public Limited Company, London (GB)

(72) Inventors: Desiree Duran Martin, Reading (GB); Raj Rajaram, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/724,424

(22) Filed: Oct. 4, 2017

(65) Prior Publication Data
US 2018/0094559 A1  Apr. 5, 2018

(30) Foreign Application Priority Data
Oct. 4, 2016  (GB) ..................... 1616811

(51) Int. Cl.
| | | |
|---|---|---|
| *B01D 53/94* | (2006.01) | |
| *B01J 23/00* | (2006.01) | |
| *B01J 23/58* | (2006.01) | |
| *B01J 37/02* | (2006.01) | |
| *B01J 37/00* | (2006.01) | |
| *B01J 35/04* | (2006.01) | |
| *B01J 23/63* | (2006.01) | |
| *C01F 17/235* | (2020.01) | |
| *F01N 3/08* | (2006.01) | |
| *F01N 3/20* | (2006.01) | |
| *C01B 21/20* | (2006.01) | |

(52) U.S. Cl.
CPC ........ B01D 53/9422 (2013.01); B01J 23/002 (2013.01); B01J 23/58 (2013.01); B01J 23/63 (2013.01); B01J 35/04 (2013.01); B01J 37/0009 (2013.01); B01J 37/0248 (2013.01); C01F 17/235 (2020.01); F01N 3/0814 (2013.01); F01N 3/0842 (2013.01); F01N 3/2066 (2013.01); *B01D 53/9477* (2013.01); *B01D 2255/1021* (2013.01); *B01D 2255/1023* (2013.01); *B01D 2255/206* (2013.01); *B01D 2255/2061* (2013.01); *B01D 2255/2065* (2013.01); *B01D 2255/20715* (2013.01); *B01D 2255/91* (2013.01); *B01D 2258/012* (2013.01); *C01B 21/20* (2013.01); *Y02T 10/12* (2013.01)

(58) Field of Classification Search
CPC ........ B01D 53/9422; B01D 2255/1021; B01D 2255/1023; B01D 2255/206; B01D 2255/2061; B01D 2255/2065; B01D 2255/20715; B01D 2255/91; B01D 2258/012; B01D 53/9477; B01J 23/002; B01J 23/58; B01J 23/63; B01J 35/04; B01J 37/0009; B01J 37/0248; F01N 3/0814; F01N 3/0842; F01N 3/2066; C01B 21/20; C01F 17/0043; Y02T 10/22
See application file for complete search history.

(56) References Cited

U.S. PATENT DOCUMENTS

| 10,391,478 B2* | 8/2019 | Duran-Martin | ...... B01J 37/0215 |
|---|---|---|---|
| 2004/0042939 A1 | 3/2004 | Rajaram et al. | |
| 2007/0014710 A1* | 1/2007 | Gerlach | ............... B01D 53/945 |
| | | | 423/213.5 |
| 2008/0026932 A1* | 1/2008 | Satoh | ................. B01D 53/9422 |
| | | | 502/73 |
| 2008/0207438 A1* | 8/2008 | Suzuki | ................. C01G 25/006 |
| | | | 502/302 |
| 2009/0084090 A1 | 4/2009 | Nakatsuji et al. | |
| 2009/0118188 A1 | 5/2009 | Knopf et al. | |
| 2009/0246109 A1 | 10/2009 | Southward | |
| 2010/0166629 A1 | 7/2010 | Deeba | |
| 2011/0258993 A1 | 10/2011 | Goersmann et al. | |
| 2012/0074061 A1* | 3/2012 | Teranishi | ............. B01D 61/362 |
| | | | 210/640 |
| 2014/0140911 A1 | 5/2014 | Bergeal et al. | |
| 2015/0224478 A1 | 8/2015 | Bergeal et al. | |
| 2016/0074836 A1* | 3/2016 | Sasaki | .................. B01J 35/0073 |
| | | | 502/330 |
| 2018/0085707 A1* | 3/2018 | Feaviour | .................. B01J 21/04 |

FOREIGN PATENT DOCUMENTS

| CN | 1784540 A | 6/2006 |
|---|---|---|
| CN | 103889554 A | 6/2014 |
| EP | 0613714 A2 | 9/1994 |
| EP | 1027919 A2 | 8/2000 |
| EP | 1913999 A1 | 4/2008 |
| EP | 2130582 A1 | 12/2009 |
| EP | 2481473 A2 | 8/2012 |
| GB | 2527884 A | 1/2016 |
| JP | 2003320222 A | 11/2003 |
| RU | 2102379 C1 | 1/1998 |
| RU | 2014130019 A | 2/2016 |
| RU | 2597090 C2 | 9/2016 |
| WO | 0240139 | 5/2002 |
| WO | 2004025096 A1 | 3/2004 |
| WO | 2004076829 A1 | 9/2004 |
| WO | 2008047170 A1 | 4/2008 |
| WO | 2012085564 | 6/2012 |
| WO | 2013074147 A1 | 5/2013 |
| WO | 2015085300 A1 | 6/2015 |
| WO | 2016092860 A1 | 6/2016 |
| WO | 2016092863 A1 | 6/2016 |
| WO | 2018065753 A1 | 4/2018 |

OTHER PUBLICATIONS

Golunski et al.; Origins of low-temperature three-way activity in Pt/CeO2; Applied Catalysis B, Environmental 5 (1995) 367-376.
Jones, Samantha; Ceria BAsed Catalysts for Low Temperature NOx Storage and Release; (2016).Theses and Dissertations—Chemistry 67.

(Continued)

*Primary Examiner* — Brandon D Lee

(57) ABSTRACT

A $NO_x$ adsorber catalyst composition, a $NO_x$ adsorber catalyst and its use in an emission treatment system for internal combustion engines, is disclosed. The $NO_x$ adsorber catalyst composition a support material and one or more platinum group metals disposed on the support material, wherein the support material comprises a $NO_x$ storage enhancer.

17 Claims, No Drawings

(56) References Cited

OTHER PUBLICATIONS

Mikajlichenko et al., "Redkozemel'nie metalli", Metallurgia, 1987, 2 pages (relevance: cited in RU2019113161 Office Action, submitted herein).
Gaylord, "Linejnie I stereoregularnie polimeri", Polimerizatsia scontroliruemim rostom tsepi, Izdatel'stvo inostrannoj iteraturi, Moskva, 1962, p. 318 (relevance: cited in RU2019113161 Office Action, submitted herein).
Kolesnikov et al., Tverdie catalizatori, ikh structura, sostav I catalyticheskaya activnost Moscow, "Oil", Igaz RGU-1, 2000, 2 pages (relevance: cited in RU2019113161 Office Action, submitted herein).
Russian Application RU2019113161 Office Action dated Mar. 19, 2021 (translated).

* cited by examiner

NOX ADSORBER CATALYST

FIELD OF THE INVENTION

The invention relates to a $NO_x$ adsorber catalyst composition, a $NO_x$ adsorber catalyst comprising the composition, and emission systems for internal combustion engines comprising the $NO_x$ adsorber catalyst.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Increasingly stringent national and regional legislation has lowered the amount of pollutants that can be emitted from such diesel or gasoline engines. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

One exhaust gas treatment component utilized to clean exhaust gas is the $NO_x$ adsorber catalyst (or "$NO_x$ trap"). $NO_x$ adsorber catalysts are devices that adsorb $NO_x$ under lean exhaust conditions, release the adsorbed $NO_x$ under rich conditions, and reduce the released $NO_x$ to form $N_2$. A $NO_x$ adsorber catalyst typically includes a $NO_x$ adsorbent for the storage of $NO_x$ and an oxidation/reduction catalyst.

The $NO_x$ adsorbent component is typically an alkaline earth metal, an alkali metal, a rare earth metal, or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the $NO_x$ adsorbent are typically loaded on a support material such as an inorganic oxide for use in the exhaust system.

The $NO_x$ adsorber catalyst performs three functions. First, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons (or via $NH_x$ or NCO intermediates) in the presence of the reduction catalyst. Typically, the nitrogen oxides are converted to nitrogen, carbon dioxide and water in the presence of heat, carbon monoxide and hydrocarbons in the exhaust stream.

Typically, $NO_x$ adsorbent materials consist of inorganic oxides such as alumina, silica, ceria, zirconia, titania, or mixed oxides which are coated with at least one platinum group metal. PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred $NO_x$ storage catalyst is taught to include cerium oxide coated with platinum and additionally platinum as an oxidizing catalyst on a support based on aluminium oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

$NO_x$ adsorber catalysts are typically exposed to cyclic oxidizing and reducing conditions. During the oxidizing cycle, $NO_x$ is stored on the catalyst. During the reducing cycle, $NO_x$ is released and/or reduced (e.g. to $N_2$). It is well known in the art (Applied Catalysis B: Environmental 5 (1995) 367-376) that certain catalysts, such as platinum on ceria ($Pt—CeO_2$), can be activated by a reduction pre-treatment. However, such activation can only be achieved above a relatively high temperature, and is reversed after re-oxidation pre-treatment.

At low temperatures (typically below about 200° C.), the $NO_x$ storage function of these catalysts is inefficient and continues to be an area of catalyst development in need of improvement. It is also desirable for catalysts to be developed that have little or no $NO_x$ storage properties at greater than a specific temperature, to allow control of when $NO_x$ is released for subsequent conversion by, for example, a further downstream catalyst.

As with any automotive system and process, it is desirable to attain still further improvements in exhaust gas treatment systems. We have discovered a new $NO_x$ adsorber catalyst composition with improved low temperature $NO_x$ storage characteristics, and improved NOx release properties.

It has surprisingly been found that $NO_x$ adsorber catalyst compositions comprising platinum group metals on a support that is doped with certain metals or metal oxides have improved low temperature $NO_x$ storage properties, and which, in certain embodiments, are more readily activated by reduction pre-treatment and retain this activation after exposure to oxidizing conditions.

SUMMARY OF THE INVENTION

In a first aspect of the invention there is provided a NOx adsorber catalyst composition comprising a support material and one or more platinum group metals disposed on the support material; wherein the support material comprises a NOx storage enhancer; the one or more platinum group metals is a mixture or alloy of platinum and palladium; and wherein the NOx storage enhancer is selected from the group consisting of scandium, yttrium, praseodymium, promethium, samarium, europium, gadolinium, terbium, dysprosium, holmium, erbium, thulium, ytterbium, lutetium, strontium, or metal oxides thereof.

In a second aspect of the invention there is provided a $NO_x$ adsorber catalyst comprising the $NO_x$ adsorber catalyst composition as hereinbefore defined supported on a metal or ceramic substrate.

In a third aspect of the invention there is provided a $NO_x$ adsorber catalyst comprising the $NO_x$ adsorber catalyst composition as hereinbefore defined, wherein the catalyst composition is extruded to form a flow-through or filter substrate.

In a fourth aspect of the invention there is provided an emission treatment system for internal combustion engines comprising the $NO_x$ adsorber catalyst as hereinbefore defined.

In a fifth aspect of the invention there is provided a method of treating an exhaust gas from an internal combustion engine comprising contacting the exhaust gas with the $NO_x$ adsorber catalyst as hereinbefore defined.

In a sixth aspect of the invention there is provided the use of a $NO_x$ storage enhancer to improve the low temperature $NO_x$ storage capacity of a support material, relative to an equivalent support material that does not contain the $NO_x$ storage enhancer.

In a seventh aspect of the invention there is provided the use of a NOx storage enhancer to improve the NOx reduction activity of a support material during a rich purge, relative to an equivalent support material that does not contain the NOx storage enhancer.

In an eighth aspect of the invention there is provided the use of a $NO_x$ storage enhancer to improve the $N_2$ selectivity of a support material during a rich purge, relative to an equivalent support material that does not contain the NOx storage enhancer.

Definitions

The term "washcoat" is well known in the art and refers to an adherent coating that is applied to a substrate, usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "substantially free of" as used herein with reference to a material means that the material in a minor amount, such as ≤5% by weight, preferably ≤2% by weight, more preferably ≤1% by weight. The expression "substantially free of" embraces the expression "does not comprise".

DETAILED DESCRIPTION OF THE INVENTION

The invention relates to a NOx adsorber catalyst composition comprising a support material and one or more platinum group metals disposed on the support material; wherein the support material comprises a NOx storage enhancer; the one or more platinum group metals is a mixture or alloy of platinum and palladium; and wherein the NOx storage enhancer is selected from the group consisting of scandium, yttrium, praseodymium, promethium, samarium, europium, gadolinium, terbium, dysprosium, holmium, erbium, thulium, ytterbium, lutetium, strontium, or metal oxides thereof.

In some preferred compositions of the invention, the $NO_x$ adsorber catalyst composition consists essentially of, or consists of, a support material, one or more platinum group metals disposed on the support material, and a $NO_x$ storage enhancer; wherein the one or more platinum group metals is a mixture or alloy of platinum and palladium; and wherein the NOx storage enhancer is selected from the group consisting of scandium, yttrium, praseodymium, promethium, samarium, europium, gadolinium, terbium, dysprosium, holmium, erbium, thulium, ytterbium, lutetium, strontium, or metal oxides thereof. By "consists essentially of" it is meant that specific further components can be present, namely those not materially affecting the essential characteristics of the $NO_x$ adsorber catalyst composition. In such compositions, the presence of other $NO_x$ storage enhancers, i.e. one or more additional $NO_x$ storage enhancers, is excluded. That is, in such compositions the only $NO_x$ storage enhancer that is present is one element or oxide thereof selected from the group consisting of scandium, yttrium, praseodymium, promethium, samarium, europium, gadolinium, terbium, dysprosium, holmium, erbium, thulium, ytterbium, strontium or lutetium.

In some preferred compositions of the invention, the $NO_x$ storage enhancer is selected from the group consisting of praseodymium, samarium, gadolinium, or holmium, or metal oxides thereof.

In a preferred composition of the invention, the $NO_x$ storage enhancer is praseodymium, or a metal oxide thereof.

In another preferred composition of the invention, the $NO_x$ storage enhancer is samarium, or a metal oxide thereof.

In another preferred composition of the invention, the $NO_x$ storage enhancer is gadolinium, or a metal oxide thereof.

In another preferred composition of the invention, the $NO_x$ storage enhancer is holmium, or a metal oxide thereof.

In another preferred composition of the invention, the $NO_x$ storage enhancer is strontium, or a metal oxide thereof.

The $NO_x$ storage enhancer may be present on the surface of the support material. The $NO_x$ storage enhancer may, additionally or alternatively, be incorporated into the support material. One example of the $NO_x$ storage enhancer being incorporated into the support material would be the replacement of atoms of the support material by atoms of components of the $NO_x$ storage enhancer, e.g. in the lattice structure of the support material.

Preferably the support material is doped with the $NO_x$ storage enhancer. The term "dopant" as used herein therefore refers to a $NO_x$ storage enhancer as hereinbefore described in such compositions in which the support material is doped with the $NO_x$ storage enhancer.

The $NO_x$ storage enhancer can be present in the $NO_x$ adsorber catalyst composition any amount, but is preferably present in an amount of about 0.5-20 mol %, more preferably about 2-18 mol %, still more preferably about 5-16 mol %, expressed as a total mol % of all of the components of the $NO_x$ storage enhancer in the $NO_x$ adsorber catalyst composition. For example, the $NO_x$ storage enhancer may be present in about 0.5, 1, 2, 4, 6, 8, 10, 12, 14, 16, 18 or 20 mol %.

The support material preferably comprises alumina, ceria, a ceria/zirconia mixed or composite oxide, or a magnesia/alumina mixed or composite oxide. Preferably the support material comprises ceria, e.g. is ceria. In some preferred embodiments, the support material is selected from the group consisting of cerium oxide, a ceria-zirconia mixed oxide, a ceria-magnesia-alumina mixed oxide, and an alumina-ceria-zirconia mixed oxide. Preferably the support material does not comprise a ceria-zirconia mixed oxide, and particularly preferably does not comprise a ceria-zirconia mixed oxide having a pyrochlore phase.

Thus particularly preferably the NOx adsorber catalyst composition consists essentially of, e.g. consists of, a support material comprising ceria (e.g. consisting essentially of, preferably consisting of, ceria), a mixture or alloy of platinum and palladium or oxides thereof, and a NOx storage enhancer selected from the group consisting of scandium, yttrium, praseodymium, promethium, samarium, europium, gadolinium, terbium, dysprosium, holmium, erbium, thulium, ytterbium, strontium or lutetium.

In some embodiments of the invention, the support material further comprises barium. It should be noted, however, that it is not necessary to include barium as a $NO_x$ storage material in compositions of the invention, i.e. barium is an optional component of compositions of the invention. In other words, some compositions of the invention are substantially free of barium. Some compositions of the invention are therefore barium-free $NO_x$ adsorber catalyst compositions comprising a $NO_x$ storage enhancer.

In embodiments where the $NO_x$ storage material does comprise barium, a preferred support material is a $CeO_2$—$BaCO_3$ composite material. Such a material can be preformed by any method known in the art, for example incipient wetness impregnation or spray-drying. If the $NO_x$ adsorber catalyst composition contains barium, the $NO_x$ adsorber catalyst composition preferably comprises 0.1 to 10 weight percent barium, and more preferably 0.5 to 5 weight percent barium, e.g. about 4.5 weight percent barium, expressed as a weight % of the composition.

Preferred support materials preferably have a surface area in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred, e.g. high surface area ceria or alumina. Other preferred support materials include magnesia/alumina composite oxides, optionally further comprising a cerium-containing component, e.g. ceria. In such cases the ceria may be present on the surface of the magnesia/alumina composite oxide, e.g. as a coating.

Compositions of the invention that are substantially free of barium, or do not comprise barium as a $NO_x$ storage material (e.g. barium-free $NO_x$ adsorber compositions), may be particularly advantageous because they store less $NO_x$ at temperatures in excess of 100, 120, 150, 180, 200, 250 or 300° C., preferably about 300° C. than a comparable barium-containing composition. In other words, compositions of the invention that are substantially free of barium, or do not comprise barium as a $NO_x$ storage material, have improved $NO_x$ release properties at temperatures in excess of 100, 120, 150, 180, 200, 250 or 300° C., preferably about 300° C. than a comparable barium-containing composition. Such compositions may also have improved sulfur tolerance relative to an equivalent barium-containing composition. In this context, "improved sulfur tolerance" means that compositions of the invention that are substantially free of barium are either more resistant to sulfation, can be thermally desulfated at a lower temperature, or both, compared to an equivalent barium-containing composition.

The one or more platinum group metals (PGM) are preferably selected from the group consisting of platinum, palladium, rhodium, or mixtures thereof. Platinum, palladium and mixtures thereof are particularly preferred, e.g. a mixture of platinum and palladium. The $NO_x$ adsorber catalyst composition preferably comprises 0.1 to 10 weight percent PGM, more preferably 0.5 to 5 weight percent PGM, and most preferably 1 to 3 weight percent PGM.

In preferred compositions of the invention, the PGM comprises platinum, more preferably is platinum.

In embodiments wherein the PGM is a mixture of platinum and palladium, the platinum and palladium may be present in any ratio. Preferably, the platinum is present in a greater than 1:1 ratio with the palladium, e.g. 2:1, 3:1, 4:1 or 5:1. In particularly preferred embodiments wherein the PGM is a mixture of platinum and palladium, the platinum:palladium ratio is 2:1 or 5:1, particularly preferably 2:1.

The $NO_x$ adsorber catalyst composition of the invention may comprise further components that are known to the skilled person. For example, the compositions of the invention may further comprise at least one binder and/or at least one surfactant. Where a binder is present, dispersible alumina binders are preferred.

The $NO_x$ adsorber catalyst composition of the present invention may be prepared by any suitable means. Preferably, the one or more platinum group metals, and/or $NO_x$ storage enhancer components (i.e. the metals or metal oxides, or mixtures thereof, or any suitable precursor thereof, e.g. the respective metal nitrate) are loaded onto the support by any known means to form the $NO_x$ adsorber catalyst composition. For example impregnation, adsorption, ion-exchange, incipient wetness, precipitation, or the like, or any other means commonly known in the art, may be used. The manner of addition is not considered to be particularly critical.

For example, the support material may be impregnated to incipient wetness with a nitrate precursor of the respective metal oxide, dried, and calcined. The resulting doped support material may then be impregnated with a PGM salt to achieve the desired PGM loading, dried, and calcined.

The order of addition of the platinum group metal (PGM) and $NO_x$ storage enhancer to the support is not considered critical. For example, the PGM and $NO_x$ storage enhancer may be added to the support simultaneously, or may be added sequentially in any order. Preferably, however, the $NO_x$ storage enhancer is added first, followed by the PGM.

A further aspect of the invention is a $NO_x$ adsorber catalyst comprising the $NO_x$ adsorber catalyst composition as hereinbefore described supported on a metal or ceramic substrate. The substrate may be a flow-through substrate or a filter substrate, but is preferably a flow-through monolith substrate.

The flow-through monolith substrate has a first face and a second face defining a longitudinal direction therebetween. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In an alternative embodiment of the invention, the $NO_x$ adsorber catalyst comprising the $NO_x$ adsorber catalyst composition as hereinbefore described is extruded to form a flow-through or filter substrate.

In embodiments wherein the $NO_x$ adsorber catalyst comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the $NO_x$ adsorber catalyst comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Preferably, the $NO_x$ adsorber catalyst as hereinbefore described is prepared by depositing the $NO_x$ adsorber catalyst composition as hereinbefore described on the substrate using washcoat procedures. A representative process for preparing the $NO_x$ adsorber catalyst component using a washcoat procedure is set forth below. It will be understood that the process below can be varied according to different embodiments of the invention.

The washcoating is preferably performed by first slurrying finely divided particles of the $NO_x$ adsorber catalyst composition in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters, may also be incorporated in the slurry as a mixture of water soluble or water-dispersible compounds or complexes.

The substrate may then be coated one or more times with the slurry such that there will be deposited on the substrate the desired loading of the $NO_x$ adsorber catalyst composition.

Preferably, the $NO_x$ adsorber catalyst comprises a substrate and at least one layer on the substrate. Preferably, the at least one layer comprises the $NO_x$ adsorber catalyst composition as hereinbefore described. This can be produced by the washcoat procedure described above. One or more additional layers may be added to the one layer of $NO_x$ adsorber catalyst composition.

In embodiments wherein one or more additional layers are present (i.e. in addition to the $NO_x$ adsorber catalyst composition), the one or more additional layers have a different composition to the first layer comprising the $NO_x$ adsorber catalyst composition.

The one or more additional layers may comprise one zone or a plurality of zones, e.g. two or more zones. Where the one or more additional layers comprise a plurality of zones, the zones are preferably longitudinal zones. The plurality of zones, or each individual zone, may also be present as a gradient, i.e. a zone may not be of a uniform thickness along its entire length, to form a gradient. Alternatively, a zone may be of uniform thickness along its entire length.

In some preferred embodiments, one additional layer, i.e. a second layer, is present.

Typically, the second layer comprises a platinum group metal (PGM) (referred to below as the "second platinum group metal"). It is generally preferred that the second layer comprises the second platinum group metal (PGM) as the only platinum group metal (i.e. there are no other PGM components present in the catalytic material, except for those specified).

The second PGM may be selected from the group consisting of platinum, palladium, and a combination or mixture of platinum (Pt) and palladium (Pd). Preferably, the platinum group metal is selected from the group consisting of palladium (Pd) and a combination or a mixture of platinum (Pt) and palladium (Pd). More preferably, the platinum group metal is selected from the group consisting of a combination or a mixture of platinum (Pt) and palladium (Pd).

It is generally preferred that the second layer is (i.e. is formulated) for the oxidation of carbon monoxide (CO) and/or hydrocarbons (HCs).

Preferably, the second layer comprises palladium (Pd) and optionally platinum (Pt) in a ratio by weight of 1:0 (e.g. Pd only) to 1:4 (this is equivalent to a ratio by weight of Pt:Pd of 4:1 to 0:1). More preferably, the second layer comprises platinum (Pt) and palladium (Pd) in a ratio by weight of <4:1, such as ≤3.5:1.

When the platinum group metal is a combination or mixture of platinum and palladium, then the second layer comprises platinum (Pt) and palladium (Pd) in a ratio by weight of 5:1 to 3.5:1, preferably 2.5:1 to 1:2.5, more preferably 1:1 to 2:1.

The second layer typically further comprises a support material (referred to herein below as the "second support material"). The second PGM is generally disposed or supported on the second support material.

The second support material is preferably a refractory oxide. It is preferred that the refractory oxide is selected from the group consisting of alumina, silica, ceria, silica alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

A particularly preferred second layer comprises a silica-alumina support, platinum, palladium, barium, a molecular sieve, and a platinum group metal (PGM) on an alumina support, e.g. a rare earth-stabilised alumina. Particularly preferably, this preferred second layer comprises a first zone comprising a silica-alumina support, platinum, palladium, barium, a molecular sieve, and a second zone comprising a platinum group metal (PGM) on an alumina support, e.g. a rare earth-stabilised alumina. This preferred second layer may have activity as an oxidation catalyst, e.g. as a diesel oxidation catalyst (DOC).

A further preferred second layer comprises, consists of, or consists essentially of a platinum group metal on alumina This preferred second layer may have activity as an oxidation catalyst, e.g. as a $NO_2$-maker catalyst.

A further preferred second layer comprises a platinum group metal, rhodium, and a cerium-containing component.

In other preferred embodiments, more than one of the preferred second layers described above are present, in addition to the $NO_x$ adsorber catalyst composition. In such embodiments, the one or more additional layers may be present in any configuration, including zoned configurations.

The $NO_x$ adsorber catalyst composition may be disposed or supported on the second layer or the substrate (e.g. the plurality of inner surfaces of the through-flow monolith substrate), preferably the second layer is disposed or supported on the $NO_x$ adsorber catalyst composition.

The second layer may be disposed or supported on the substrate (e.g. the plurality of inner surfaces of the through-flow monolith substrate).

The second layer may be disposed or supported on the entire length of the substrate or the $NO_x$ adsorber catalyst composition. Alternatively the second layer may be disposed or supported on a portion, e.g. 5%, 10%, 20%, 30%, 40%, 50%, 60%, 70%, 80%, 90%, or 95%, of the substrate or the $NO_x$ adsorber catalyst composition.

Preferably, the entire length of the substrate is coated with the $NO_x$ adsorber catalyst composition.

A further aspect of the invention is an emission treatment system for treating a flow of a combustion exhaust gas that comprises the $NO_x$ adsorber catalyst as hereinbefore described. In preferred systems, the internal combustion engine is a diesel engine, preferably a light duty diesel engine. The $NO_x$ adsorber catalyst may be placed in a close-coupled position or in the underfloor position.

The emission treatment system typically further comprises an emissions control device.

The emissions control devices is preferably downstream of the $NO_x$ adsorber catalyst. Alternatively, the emissions control device may be upstream of the $NO_x$ adsorber catalyst.

Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC™) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the emission treatment system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the emission treatment system of the invention comprises an SCR catalyst or an SCRF™ catalyst, then the emission treatment system may further comprise an injector for injecting a nitrogenous reductant, such as ammonia, or an ammonia precursor, such as urea or ammonium formate, preferably urea, into exhaust gas downstream of the $NO_x$ adsorber catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst), e.g. a $NO_x$ adsorber catalyst comprising the $NO_x$ adsorber catalyst composition of the invention. Thus, the emission treatment system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe, Mn), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the emission treatment system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first emission treatment system embodiment, the emission treatment system comprises the $NO_x$ adsorber catalyst of the invention and a catalysed soot filter (CSF). The $NO_x$ adsorber catalyst is typically followed by (e.g. is upstream of) the catalysed soot filter (CSF). Thus, for example, an outlet of the $NO_x$ adsorber catalyst is connected to an inlet of the catalysed soot filter.

A second emission treatment system embodiment relates to an emission treatment system comprising the $NO_x$ adsorber catalyst of the invention, a catalysed soot filter (CSF) and a selective catalytic reduction (SCR) catalyst.

The $NO_x$ adsorber catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third emission treatment system embodiment, the emission treatment system comprises the $NO_x$ adsorber catalyst of the invention, a selective catalytic reduction (SCR) catalyst and either a catalysed soot filter (CSF) or a diesel particulate filter (DPF).

In the third emission treatment system embodiment, the $NO_x$ adsorber catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalyzed monolith substrate may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth emission treatment system embodiment comprises the $NO_x$ adsorber catalyst of the invention and a selective catalytic reduction filter (SCRF™) catalyst. The $NO_x$ adsorber catalyst of the invention is typically followed by (e.g. is upstream of) the selective catalytic reduction filter (SCRF™) catalyst.

A nitrogenous reductant injector may be arranged between the $NO_x$ adsorber catalyst and the selective catalytic reduction filter (SCRF™) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Another aspect of the invention relates to a vehicle. The vehicle comprises an internal combustion engine, preferably a diesel engine. The internal combustion engine, preferably the diesel engine, is coupled to an emission treatment system of the invention.

It is preferred that the diesel engine is configured or adapted to run on fuel, preferably diesel fuel, comprising ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the $NO_x$ adsorber catalyst as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 100 to 300° C.

In further preferred methods of treating an exhaust gas from an internal combustion engine, the exhaust gas is contacted with one or more further emissions control devices, in addition to the $NO_x$ adsorber catalyst as hereinbefore described. The emissions control device or devices is preferably downstream of the $NO_x$ adsorber catalyst.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, a cold start catalyst (dCSC™), and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the $NO_x$ adsorber catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first embodiment, the method comprises contacting the exhaust gas with the $NO_x$ adsorber catalyst of the invention and a catalysed soot filter (CSF). The $NO_x$ adsorber catalyst is typically followed by (e.g. is upstream of) the catalysed soot filter (CSF). Thus, for example, an outlet of the $NO_x$ adsorber catalyst is connected to an inlet of the catalysed soot filter.

A second embodiment of the method of treating an exhaust gas relates to a method comprising contacting the exhaust gas with the $NO_x$ adsorber catalyst of the invention, a catalysed soot filter (CSF) and a selective catalytic reduction (SCR) catalyst.

The $NO_x$ adsorber catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third embodiment of the method of treating an exhaust gas, the method comprises contacting the exhaust gas with the $NO_x$ adsorber catalyst of the invention, a selective catalytic reduction (SCR) catalyst and either a catalysed soot filter (CSF) or a diesel particulate filter (DPF).

In the third embodiment of the method of treating an exhaust gas, the $NO_x$ adsorber catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth embodiment of the method of treating an exhaust gas comprises the $NO_x$ adsorber catalyst of the invention and a selective catalytic reduction filter (SCRF™) catalyst. The $NO_x$ adsorber catalyst of the invention is typically followed by (e.g. is upstream of) the selective catalytic reduction filter (SCRF™) catalyst.

A nitrogenous reductant injector may be arranged between the $NO_x$ adsorber catalyst and the selective catalytic reduction filter (SCRF™) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth method embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

A further aspect of the invention is the use of a $NO_x$ storage enhancer to improve the low temperature $NO_x$ storage capacity of a support material, relative to an equivalent support material that does not contain the $NO_x$ storage enhancer. This is advantageous because at low temperatures (typically below about 200° C.), the $NO_x$ storage function of existing catalysts is typically inefficient and continues to be an area of catalyst development in need of improvement.

A further aspect of the invention is the use of a $NO_x$ storage enhancer to improve the $NO_x$ reduction activity of a support material during a rich purge, relative to an equivalent support material that does not contain the $NO_x$ storage enhancer.

A further aspect of the invention is the use of a $NO_x$ storage enhancer to improve the $N_2$ selectivity of a support material during a rich purge, relative to an equivalent support material that does not contain the $NO_x$ storage enhancer. This is advantageous because a poorly selective catalyst can result in the formation of $N_2O$ rather than $N_2$, which is itself a pollutant and hence is generally undesirable to be formed in emission treatment systems.

In preferred uses of the invention as hereinbefore described, the $NO_x$ storage enhancer is selected from the group consisting of scandium, yttrium, praseodymium, promethium, samarium, europium, gadolinium, terbium, dysprosium, holmium, erbium, thulium, ytterbium, lutetium, strontium, or metal oxides thereof.

EXAMPLES

The invention will now be illustrated by the following non-limiting examples.

Materials

The materials were prepared according to the following general methods:

Method 1

A high surface area $CeO_2$ (surface area=156 $m^2\ g^{-1}$) was impregnated to incipient wetness with the nitrate precursor of the respective metal oxide of the dopant(s) to be used. The resulting doped $CeO_2$ was dried at 110° C. overnight, followed by calcination in air at 500° C./2 h. The doped $CeO_2$ was then impregnated with a platinum salt to achieve a Pt loading of 1 wt %. The Pt-impregnated doped ceria was dried at 110° C. and then calcined in air at 500° C./2 h. Table 1 below lists the different catalysts prepared.

TABLE 1

| | Catalyst | Dopant (mol %) |
|---|---|---|
| 1 | 1Pt/$CeO_2$ | — |
| 2 | 1Pt/Nd—$CeO_2$ | Nd (10) |
| 3 | 1Pt/La—$CeO_2$ | La (10) |
| 4 | 1Pt/Gd—$CeO_2$ | Gd (10) |
| 5 | 1Pt/Pr—$CeO_2$ | Pr (10) |
| 6 | 1Pt/Sm—$CeO_2$ | Sm (10) |
| 7 | 1Pt/Ho—$CeO_2$ | Ho (10) |
| 8 | 1Pt/Sr—$CeO_2$ | Sr (6) |

Method 2

A high surface area $CeO_2$ (surface area=156 $m^2\ g^{-1}$) was impregnated to incipient wetness with the nitrate precursor of the respective metal oxide of the dopant(s) to be used. The resulting doped $CeO_2$ was dried at 110° C. overnight, followed by calcination in air at 500° C./2 h. The doped $CeO_2$ was then impregnated with a palladium salt to achieve a Pd loading of 1 wt %. The Pd-impregnated doped ceria was dried at 110° C. and then calcined in air at 500° C./2 h. Table 2 below lists the different catalysts prepared.

TABLE 2

| | Catalyst | Dopants (mol %) |
|---|---|---|
| 1 | 1Pd/$CeO_2$ | — |
| 2 | 1Pd/Nd—$CeO_2$ | Nd (10) |
| 3 | 1Pd/Gd—$CeO_2$ | Gd (10) |

Experimental Results

Storage Tests

Example 1

The $NO_x$ storage activity in air at 500° C. of each of the powdered catalyst materials obtained by the general methods above was evaluated in a gas mixture containing 60 ppm NO, 1500 ppm CO, 400 ppm $C_3H_6$, 10% $O_2$, 5% $CO_2$ and 5% $H_2O$, with the remainder of the gas being nitrogen, using 0.4 grams of each powder catalyst sieved to between 250<d<355 microns and at a volumetric gas flow rate of 2 liters per minute at a MHSV of 300 $L\cdot hr^{-1}\cdot g^{-1}$. During the test, the gas mixture was diverted from the catalyst for the first minute before being passed through the sample for 5 minutes at the storage temperature (100, 150 or 200° C.). This adsorption stage is followed by Temperature Programmed Desorption (TPD) at a ramping rate of 15° C./minute in the presence of the NO-containing gas until the bed temperature reaches about 270° C. Each catalyst material was then exposed to a reducing gas mixture (Lambda=0.93) for 15 s.

The amount of $NO_x$ and other gases present in the gas mixture was measured using Fourier transform infrared (FTIR) spectroscopy. The $NO_x$ storage, calculated as the amount of $NO_2$ stored per gram of catalyst during the 5 minute period, is shown in Table 3 below. In each of catalysts 2, 3 and 5-10 below, the dopant is present in 10 mol %. In catalyst 11, the dopant is present in 6 mol %.

TABLE 3

| | | $NO_2$ stored (mg/g) | | |
|---|---|---|---|---|
| | Catalyst | 100° C. | 150° C. | 200° C. |
| 1 | 1Pd/$CeO_2$ | 2.15 | 1.26 | 0.82 |
| 2 | 1Pd/Nd—$CeO_2$ | 2.03 | 2.00 | 1.56 |
| 3 | 1Pd/Gd—$CeO_2$ | 2.08 | 1.97 | 1.63 |
| 4 | 1Pt/$CeO_2$ | 0.65 | 0.49 | 2.23 |
| 5 | 1Pt/Nd—$CeO_2$ | 0.98 | 1.14 | 2.50 |
| 6 | 1Pt/La—$CeO_2$ | 0.76 | 1.36 | 2.28 |
| 7 | 1Pt/1Gd—$CeO_2$ | 0.99 | 0.87 | 2.57 |
| 8 | 1Pt/Pr—$CeO_2$ | 0.87 | 0.95 | 2.54 |
| 9 | 1Pt/Sm—$CeO_2$ | 1.02 | 1.11 | 2.61 |
| 10 | 1Pt/Ho—$CeO_2$ | 0.92 | 1.12 | 2.53 |
| 11 | 1Pt/Sr—$CeO_2$ | 0.83 | 1.10 | — |

From the results shown above in Table 3, it is clear that the doped $CeO_2$ materials, i.e. entries 2, 3 and 5-11 in Table 3, generally store a higher amount of $NO_x$ than the undoped materials, i.e. entries 1 and 4.

It can also be seen from the results shown in Table 3 that the same effect was observed for Pd-containing samples as for Pt-containing samples. The effect is more pronounced in the Pd-containing samples at 150 and 200° C. It is notable that this effect is observed in the Pt-containing samples even at the relatively low temperature of 100° C., which demonstrates an advantageous increase in low temperature $NO_x$ storage that can be obtained by using these $NO_x$ storage enhancers.

Example 2

Powdered catalyst materials in Table 5 below were obtained by the general methods above, but with each catalyst pre-aged at 800° C. for 24 hours prior to testing (rather than at 500° C. for 2 hours). In each of catalysts 2-8 below, the dopant is present in 10 mol %. The samples were tested under the cyclic test described below The $NO_x$ Storage Activity of the catalysts comprising a $NO_x$ storage enhancer was also measured under cyclic oxidising (lean) and reducing (rich) conditions. The samples were first thermally aged in air at 800° C. for 24 hrs prior to measurements being taken. The gas mixture during the oxidising and reducing period is shown in Table 4 below.

TABLE 4

| Gas | Lean (Lambda = 2.30) | Rich (Lambda = 0.95) |
|---|---|---|
| $O_2$ | 12% | 1.3% |
| $CO_2$ | 6% | 6% |
| $H_2O$ | 6% | 6% |
| NO | 200 ppm | 200 ppm |
| $C_3H_6$ | 200 ppm | 1000 ppm |
| CO | 1500 ppm | 21000 ppm |
| $H_2$ | 0 ppm | 7500 ppm |
| $N_2$ | remainder | remainder |

The oxidising period of the test was 300 seconds and the reducing period 16 seconds. The weight of powder sample used was 0.4 grams sieved to between 250<d<355 microns and a volumetric gas flow rate of 2 litres per minute at a MHSV of 300 L*hr$^{-1}$*g$^{-1}$. The system was at an initial temperature of 150° C. During the test, the gas mixture was diverted from the catalyst for the first minute before being passed through the sample and cycling between the oxidising and reducing conditions for 3 complete cycles, finishing under the reducing condition. The sample temperature was then increased and the test repeated.

The NOx storage test results are shown in Table 5 below

TABLE 5

| | Catalyst | 150° C. | | 200° C. | | 250° C. | | 300° C. | |
|---|---|---|---|---|---|---|---|---|---|
| | | $1^{st}$ | $3^{rd}$ | $1^{st}$ | $3^{rd}$ | $1^{st}$ | $3^{rd}$ | $1^{st}$ | $3^{rd}$ |
| 1 | 1Pt/CeO$_2$ | 1.37 | 0.98 | 1.04 | 1.49 | 0.64 | 1.56 | 0.74 | 1.71 |
| 2 | 1Pt/Nd—CeO$_2$ | 1.41 | 1.21 | 1.25 | 1.59 | 1.27 | 1.87 | 1.39 | 2.76 |
| 3 | 1Pt/La—CeO$_2$ | 1.81 | 1.55 | 0.98 | 1.30 | 0.55 | 1.26 | 1.55 | 2.84 |
| 4 | 1Pt/Pr—CeO$_2$ | 1.97 | 1.33 | 1.11 | 1.54 | 0.74 | 2.54 | 2.47 | 2.94 |
| 5 | 1Pt/Sm—CeO$_2$ | 2.14 | 1.49 | 1.20 | 1.72 | 0.99 | 2.70 | 2.03 | 2.80 |
| 6 | 1Pt/1Gd—CeO$_2$ | 1.85 | 1.85 | 2.50 | 2.77 | 1.86 | 2.67 | 2.16 | 3.22 |
| 7 | 1Pt/Ho—CeO$_2$ | 1.79 | 1.42 | 1.30 | 1.52 | 1.00 | 1.62 | 2.75 | 3.16 |
| 8 | 1Pt/Ba—CeO$_2$ | 1.42 | 1.38 | 1.19 | 1.42 | 1.24 | 1.43 | 1.00 | 1.68 |

From the results shown above in Table 5, it is clear that the doped CeO$_2$ materials, i.e. entries 2-8 in Table 5, generally store a higher amount of NO$_x$ than the undoped materials, i.e. entry 1.

It can also be seen that catalysts containing a NO$_x$ storage enhancer as hereinbefore described, e.g. entries 4-7, have higher NO$_x$ storage capacity (measured as NO$_2$ stored) than the known NO$_x$ storage material of Pt/Ba—CeO$_2$ (entry 8 in Table 5). This can be particularly advantageous for applications where it is desirable to limit the amount of NO$_x$ released at relatively high temperatures.

The results in Table 5 also show that it is possible to tune the release temperature window of NO$_x$ from these catalyst materials by appropriate choice of NO$_x$ storage enhancer.

Example 3

The powdered catalyst materials used in Example 2 above were activated by exposure to a rich gas mixture (described in Table 4 above) at 300° C. for 5 minutes prior to being tested for NO$_x$ storage capacity. NO$_x$ storage was tested by the method described in Example 2 above. The NO$_x$ storage test results are shown in Table 6 below.

TABLE 6

| | Catalyst | NO$_2$ stored (mg/g) | | |
|---|---|---|---|---|
| | | 150° C. | 200° C. | 250° C. |
| 1 | 1Pt/CeO$_2$ | 2.50 | 2.71 | 2.30 |
| 2 | 1Pt/Nd—CeO$_2$ | 2.71 | 3.76 | 3.29 |
| 3 | 1Pt/La—CeO$_2$ | 3.01 | 5.83 | 5.00 |
| 4 | 1Pt/Pr—CeO$_2$ | 3.03 | 5.26 | 3.77 |
| 5 | 1Pt/Sm—CeO$_2$ | 3.78 | 5.08 | 4.31 |
| 6 | 1Pt/1Gd—CeO$_2$ | 3.47 | 4.96 | 4.39 |
| 7 | 1Pt/Ho—CeO$_2$ | 4.27 | 4.68 | 4.34 |
| 8 | 1Pt/Ba—CeO$_2$ | 1.41 | 2.01 | 2.46 |

From the results shown in Table 6, it can be seen that activation of the catalysts comprising a NO$_x$ storage enhancer (e.g. entries 4-8 in Table 5) further enhances their NO$_x$ storage capacity (measured as NO$_2$ stored) relative to both the control sample (entry 1) and the known Ba-containing material (entry 8), particularly at 200° C.

Example 4

The powdered catalyst materials used in Example 2 above were deactivated by exposure to a gas mixture comprising 6% H$_2$O, 6% CO$_2$ and 12% O$_2$ (balance N$_2$) at 500° C. for 10 minutes prior to being tested for NO$_x$ storage capacity. NO$_x$ storage was tested by the method described in Example 2 above. The NO$_x$ storage test results are shown in Table 7 below.

TABLE 7

| | Catalyst | NO$_2$ stored (mg/g) 150° C. |
|---|---|---|
| 1 | 1Pt/CeO$_2$ | 1.23 |
| 2 | 1Pt/Nd—CeO$_2$ | 2.59 |
| 3 | 1Pt/La—CeO$_2$ | 1.83 |
| 4 | 1Pt/Pr—CeO$_2$ | 1.40 |
| 5 | 1Pt/Sm—CeO$_2$ | 1.70 |
| 6 | 1Pt/1Gd—CeO$_2$ | 1.64 |
| 7 | 1Pt/Ho—CeO$_2$ | 1.71 |
| 8 | 1Pt/Ba—CeO$_2$ | 1.26 |

It can be seen from the results shown in Table 7 that catalysts comprising a NO$_x$ storage enhancer, e.g. entries 4-7 in Table 7, have higher NO$_x$ storage capacity (measured as NO$_2$ stored) than the control sample containing only Pt/CeO$_2$ (entry 1 in Table 7), and than the known NO$_x$ storage material of Pt/Ba—CeO$_2$ (entry 8 in Table 7).

The invention claimed is:
1. A NO$_x$ adsorber catalyst composition comprising a metal or ceramic substrate, a first layer, and a second layer, wherein said first layer comprises a support material and one or more platinum group metals disposed on the support material;
  wherein the support material is doped with a $NO_x$ storage enhancer;
  wherein the one or more platinum group metals is a mixture or alloy of platinum and palladium;
  wherein the $NO_x$ storage enhancer is selected from the group consisting of scandium, yttrium, promethium, europium, dysprosium, holmium, erbium, thulium, ytterbium, lutetium, strontium, or metal oxides thereof; and
  wherein the second layer comprises a platinum group metal (PGM).

2. The $NO_x$ adsorber catalyst composition of claim 1, wherein the $NO_x$ storage enhancer is holmium, or metal oxides thereof.

3. The $NO_x$ adsorber catalyst composition of claim 1, wherein the support material is selected from the group consisting of cerium oxide, a ceria-zirconia mixed oxide, a ceria-magnesia-alumina mixed oxide, and an alumina-ceria-zirconia mixed oxide.

4. The NOx adsorber catalyst composition according to claim 3, wherein the support material is cerium oxide.

5. The $NO_x$ adsorber catalyst composition of claim 1, the first layer comprises barium.

6. The $NO_x$ adsorber catalyst composition of claim 1, wherein the $NO_x$ adsorber catalyst composition is substantially free of barium.

7. The $NO_x$ adsorber catalyst of claim 1, wherein the metal or ceramic substrate is a flow-through monolith or a filter monolith.

8. An emission treatment system for treating a flow of a combustion exhaust gas comprising an internal combustion engine and the $NO_x$ adsorber catalyst of claim 1.

9. The emission treatment system of claim 8, wherein the internal combustion engine is a diesel engine.

10. The emission treatment system of claim 8, further comprising a selective catalytic reduction catalyst system, a particulate filter, a selective catalytic reduction filter system, a passive $NO_x$ adsorber, a three-way catalyst system, or combinations thereof.

11. A method for treating an exhaust gas from an internal combustion engine comprising contacting the exhaust gas with the $NO_x$ adsorber catalyst of claim 1.

12. The method of claim 11, wherein the exhaust gas is at a temperature of about 100 to 300° C.

13. The method of claim 11, wherein the $NO_x$ adsorber catalyst has a higher $NO_x$ storage capacity relative to an equivalent support material that does not contain the $NO_x$ storage enhancer.

14. The method of claim 11 further comprising a rich purge step, wherein the $NO_x$ adsorber catalyst has a higher $NO_x$ reduction activity during the rich purge relative to an equivalent support material that does not contain the $NO_x$ storage enhancer.

15. The method of claim 11 further comprising a rich purge step, wherein the $NO_x$ adsorber catalyst has a higher $N_2$ selectivity relative to an equivalent support material that does not contain the $NO_x$ storage enhancer.

16. The $NO_x$ adsorber catalyst of claim 1, wherein the $NO_x$ storage enhancer is present in an amount of about 0.5-20 mol. %, expressed as a total mol % of all of the components of the $NO_x$ storage enhancer.

17. The $NO_x$ adsorber catalyst of claim 1, wherein the one or more platinum group metals is present in an amount of 0.5-5 weight %.

\* \* \* \* \*